United States Patent [19]

Lane et al.

[11] Patent Number: 4,535,445
[45] Date of Patent: Aug. 13, 1985

[54] CONFERENCING SYSTEM ADAPTIVE SIGNAL CONDITIONER

[75] Inventors: Michael S. Lane, Colts Neck; Steven D. Scholbrock, Freehold, both of N.J.

[73] Assignee: AT&T Information Systems, Holmdel, N.J.

[21] Appl. No.: 505,106

[22] Filed: Jun. 16, 1983

[51] Int. Cl.³ .............................................. H04Q 11/04
[52] U.S. Cl. .......................................... 370/62; 381/47
[58] Field of Search ...................... 179/18 BC; 370/62; 381/47, 57

[56] References Cited

U.S. PATENT DOCUMENTS

| | | |
|---|---|---|
| 3,649,766 | 3/1972 | LaMarche . |
| 3,801,747 | 4/1974 | Yves-Queffeulou et al. . |
| 4,028,496 | 6/1977 | LaMarche . |
| 4,167,653 | 9/1979 | Araseki et al. ................... 179/1 SC |
| 4,197,429 | 4/1980 | Sparber ........................... 179/18 BC |
| 4,274,155 | 6/1981 | Funderburk et al. ................. 370/62 |
| 4,277,645 | 7/1981 | May, Jr. ............................ 179/1 SC |
| 4,281,218 | 7/1981 | Chuang et al. ..................... 179/1 SC |
| 4,288,871 | 9/1981 | Baugh ................................ 370/62 |
| 4,300,231 | 11/1981 | Moffitt .......................... 179/18 BC |
| 4,351,983 | 9/1982 | Crouse et al. ..................... 179/1 SC |
| 4,387,457 | 6/1983 | Munter ................................ 370/62 |
| 4,393,496 | 7/1983 | Zeitraeg .............................. 370/62 |
| 4,467,143 | 8/1984 | Warman .......................... 179/18 BC |

OTHER PUBLICATIONS

"Network Services Audio Bridge", J. H. Bobsin et al., *IEEE International Conference on Communications*, Jun. 15, 1982, pp. 4E.3.1-4E.3.5.

Primary Examiner—Douglas W. Olms
Assistant Examiner—Curtis Kuntz
Attorney, Agent, or Firm—Frederick B. Luludis

[57] ABSTRACT

The disclosed arrangement of digital signal processor and echo cancellor is connectable to four wire transmission facilities on a per port basis for providing adaptive signal conditioning to reduce noise and improve level contrast among conferees of a digital conference connection. The digital signal processor applies an adaptive gain value to incoming speech signals for either increasing or decreasing the level of these signals to meet a predetermined threshold. A fixed gain adjustment is applied to incoming noise signals to reduce the level of these signals. The arrangement also provides a last-talker holdover mode in which the last gain adjustment applied to last-talker speech is applied to idle channel noise on that line.

15 Claims, 11 Drawing Figures

STRETCH PEAK

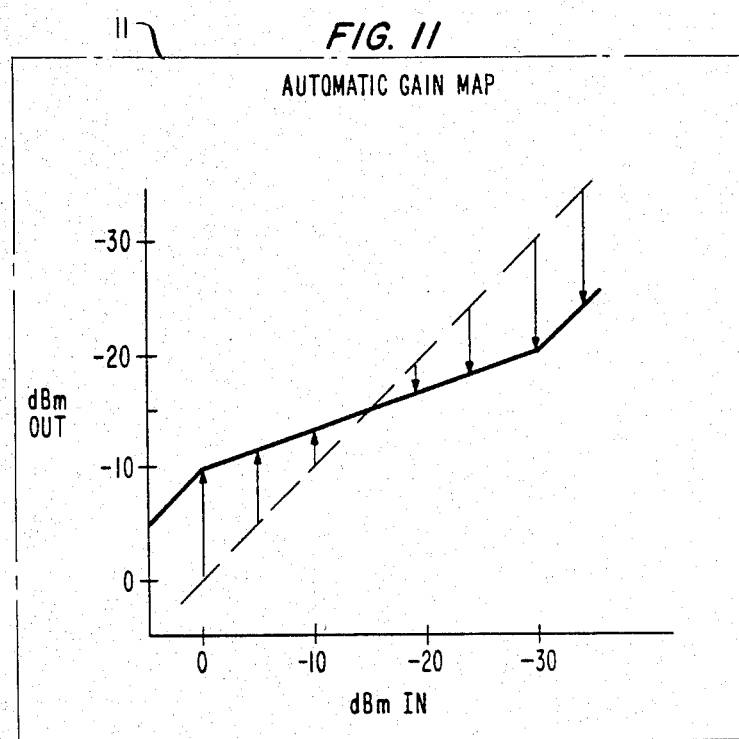

CONFERENCING SYSTEM ADAPTIVE SIGNAL CONDITIONER

TECHNICAL FIELD

This invention relates to the art of signal conditioning and more particularly to a signal conditioning arrangement which provides level compensation, eliminates echo signals and greatly reduces noise signals.

In communication systems level contrast is the term used to characterize the speech energy of one speaker as compared against the speech energy of another speaker. In such systems, level contrast between speakers is affected by the quality of the transmission facilities, and in two party conversations the contrast is generally not noticeable. In conference connections involving three parties, however, level contrast is generally noticeable particularly when contrasting the speech energy of the most distant speaker against the near-end speaker. The problem of level contrast becomes more acute when the size of a conference connection involves more than three parties. Because of these problems, business customer systems, such as PBXs, do not guarantee the quality of a conferencing connection involving more than two trunks.

Traditionally, these problems have been solved with an echo suppressing anti-singing (ESAS) circuit which is essentially two echo suppressors placed back to back. However, an ESAS circuit cannot be used as a signal conditioner in a digital conferencing system since such circuits use switched gain techniques thereby blocking double talk from occurring. Double talk, defined as the capability of allowing simultaneous utterances from multiple speakers, is an essential feature of digital conferencing systems. ESAS circuits also introduce line noise when switching and tend to clip leading and trailing speech syllables.

Also, in audio teleconferencing systems in which each conferee of a conference connection receives the sum of speech signals of other conferees, idle channel noise from a non-speaking conferee and echo from a speaking conferee are also included in the conference summation. Attempts at providing level compensation and eliminating noise and echo signals from a conference summation have been made in analog conferencing arrangements. However, an analog signal treatment circuit requires D/A and A/D converters when such an arrangement is employed in a digital conferencing system. Moreover, such analog arrangement are unacceptably expensive and are not compatible with an adaptive digital echo cancellor, such as the AT&T 140Y Echo Cancellor. Further, when the level of noise is greatly reduced or eliminated, the conference summation is essentially zero, thereby giving the appearance that the connection is inoperative.

To control noise summation, some type of speech activated noise guard is required so that noise from nonactive talkers in a conference arrangement can be eliminated. In addition, detection of speech activity is desirable to determine an average talker level whereby an automatic gain control function can be implemented.

Thus, there is a need in the art for a voice signal treatment arrangement for digital conference arrangements which provides level compensation, reduces noise signals and eliminates echo signals, but provides idle channel noise from the last speaker's line as an indication that the conference connection is viable.

SUMMARY OF THE INVENTION

The problems and inadequacies exhibited by prior signal conditioning arrangements for conferencing facilities have been obviated by arranging an echo cancellor and a digital signal processor on a four-wire facility to provide an adaptive speech detection arrangement in which incoming signals are classified as either speech, noise or echo. The particular signal classification is used to provide signal gain or signal loss in order to adjust level compensation and to balance contrast among conferees. Also, when the system detects transmitted speech and detects the absence of speech on its receive path, it effects a last talker holdover mode. In this mode, the Digital Signal Processor (DSP) program does not reduce the gain of noise signals but allows a higher level of noise from the last talker's line to be transmitted to the other conferees as an indication that the conference connection is viable. On the other hand, when the digital signal processor detects speech on its receive path and no speech on its transmit path, it decreases the gain of its transmit path to prevent noise on that line from being summed with other conferees' speech signals.

The digital signal processor is also arranged to predict an echo signal by monitoring the receive path of its conference line and by assuming a minimum return loss. In this manner, the digital signal processor has the capability of discerning transmitted speech from return echo. If a signal is classified as return echo, the digital signal processor inserts loss to decrease the level of the echo signal.

BRIEF DESCRIPTION OF THE DRAWING

The operation and implementation of the present invention will be more fully apparent and understandable from the following description of the drawing, in which:

FIG. 11 shows the automatic gain map used in constructing the gain table.

GENERAL DESCRIPTION

Figure 1:
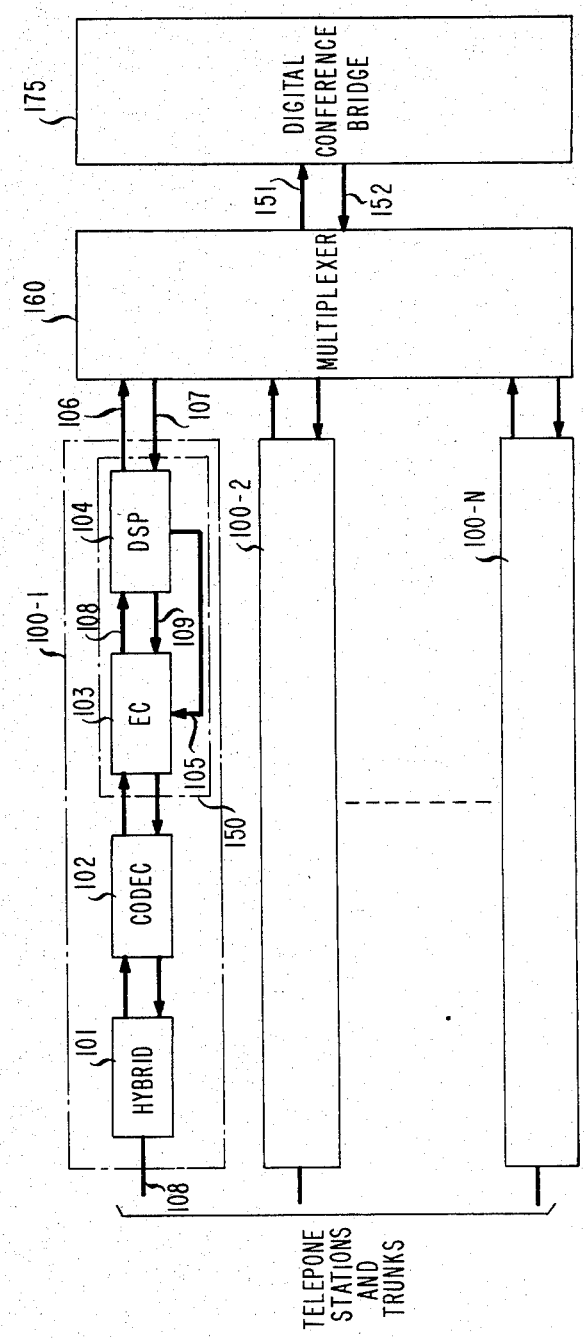
FIG. 1 is a block diagram of a conferencing system employing the invention.

FIG. 1 shows a representative digital conferencing arrangement. For each incoming station and trunk circuit connected via line 108 there is an appropriate line circuit 100, two-wire to four-wire hybrid 101 and analog-to-digital codec 102. The output of codec 102 is a digital signal that is either directly connected or possibly switched to an adaptive signal conditioning circuit 150. Signal conditioning circuit 150 consists of echo cancellor 103 and DSP 104 in combination to provide the desired signal processing. The output of each adaptive signal conditioning circuit 150 is multiplexed by multiplexer 160 and supplied to digital conferencing bridge 175. Digital conferencing bridge 175 provides summation of all incoming talker signals of a particular conference connection and outputs to each conferee the appropriate conference sum. This conference sum is demultiplexed and returned to signal conditioning circuit 150 of line circuit 100-1.

Figure 2:
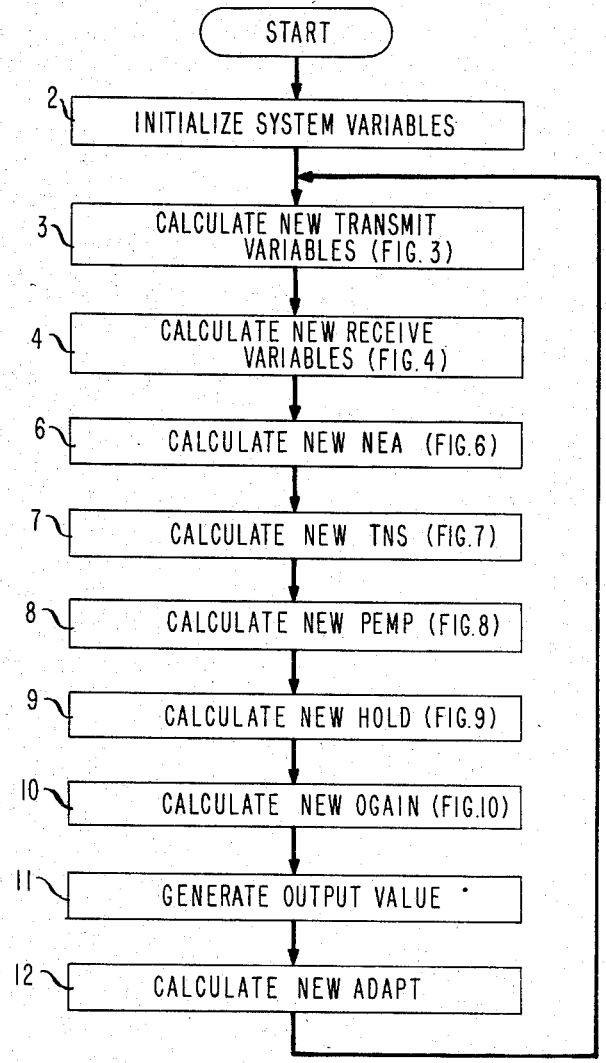
FIG. 2 is a flow diagram of the invention.

FIG. 2 illustrates a flow chart of the adaptive signal conditioning algorithm implemented in DSP 104. The program can be invoked by a system wide reset signal or by the initiation of a conference call (not shown). After initializing certain speech detector variables, the program enters a loop to process each incoming digital speech sample as it becomes available. A transmitted signal from the conferee is processed by the DSP 104 program to generate a transmit magnitude signal (TMAG). This signal parameter is passed through a low pass filter to generate a transmit energy value (TEMP). In addition, a minimum transmit energy level (MEMP) is maintained by the program by tracking TEMP minimums. These minimums represent the background noise level in the transmitted signal. By allowing MEMP to slowly drift upward between TEMP minimums, it is possible to track changes in the noise level. This allows a DSP 140 speech detector to adapt to high noise levels but still detect weak speech signals, making it useful over a wider range of noise and speaker levels than would be possible with fixed thresholds.

Since it is impossible to differentiate between echoed receive speech and weak transmit speech, some measure of the expected echo is necessary. Thus the receive signal is similarly processed to obtain a receive magnitude (RMAG) and a receive energy (REMP) signal parameter. A peak stretcher is used to obtain an expected echo envelope (SRECV). This involves catching REMP peaks and holding them for a time equal to the longest expected echo delay.

Once the transmit and receive signal parameters are available, a variety of comparisons are made to determine if speech is present. The comparisons are based on statistical observations of speech signals verses non-speech signals as established for a TASI system.

Since any received speech remaining after passing through hybrid 101 and echo cancellor 103 appears to be weak transmitted speech it is first necessary to establish the following:

TEMP>SRECV—minimum return loss (MRL)

Once this relation is assured, the transmit signal is checked for the appearance of speech by performing the following comparisons as disclosed in U.S. Pat. No. 4,277,645, issued to C. J. May on July 7, 1981.

TMAG>10*MEMP or

TEMP>2*MEMP or

TEMP>maximum noise level (MNL)

If any of these comparisons are true, the signal is classified as speech and a near-end active (NEA) flag is set. This flag is further modified by appropriate holdover times to generate a trunk needs service (TNS) flag.

In order to maintain a background noise level during inter-talker gaps a HOLD signal is generated by having a crude speech detector on the receive signal which allows a talker to remain active at least as long as the TNS flag is set and at most until another participant speaks.

When transmit speech is detected an appropriate gain value is selected and applied to the speech signal. This is accomplished by tracking the TEMP level with a peak follower and mapping this peak transmit energy (PEMP) to the gain value to be used. Ideally, PEMP represents a running average related to the VU level of the speaker. This speaker level is then mapped to an appropriate gain value. The mapping is implemented such that if the HOLD flag is not set (someone else active) a fixed loss is used. If the HOLD flag is set, a mapped gain is used to obtain the desired speaker level compression.

A wideband energy detector is implemented by comparing the receive signal magnitude (RMAG) to receive energy (REMP). If this average-to-peak ratio exceeds a fixed threshold, the echo cancellor adapt signal is set via lead 105. The adapt signal is equipped with a wait time to provide noise immunity during signal start up.

DETAILED DESCRIPTION

FIG. 1 shows a detailed implementation of the invention. A line circuit, such as line circuit 100-1, handles the two-wire input from either a telephone or a CO line, such as line 108, or other appropriate station. Two-wire to four-wire hybrid 101 converts a two-wire signal channel to a four-wire channel with separate transmit and receive paths. This is necessary for further processing via codec 102 which converts an analog signal into a digital compressed representation of an inputted speech signal and converts a digital compressed speech signal back to an analog signal for return to a remote station or trunk via line 108.

Adaptive signal conditioning circuit 150 consisting of echo cancellor 103 and digital signal processor (DSP) 104 may be connected directly to line circuit 100-1 or alternatively be connected via a switching mechanism. Thus, the signal conditioning circuit is part of line circuit 100-1 only for those line circuits involved in a true conference arrangement. For example, a simple two party connection would not require the signal conditioning circuit 150.

Echo cancellor 103 is provided to reduce echo on a line, such as line 108, and provides a known minimum return loss which is desirable for a DSP 104 software speech detection algorithm.

An echo cancellor, such as echo cancellor 103, may be sensitive to pure tone or a combination of tone signals, such as a digit or call progress tones. Because of this, it is desirable to have DSP 104 generate a control signal via lead 105 to assist echo cancellor 103 in its adaptation algorithm. The control signal outputted by DSP 104 via lead 105 will be discussed shortly.

Still referring to FIG. 1, multiplexer 160 multiplexes the outputs from a plurality of line circuits, such as line circuit 100-1, and generates as an output a time division multiplexed signal that is supplied to digital conferencing bridge 175 via bus 151. In a like manner, multiplexer 150 demultiplexes time slot information outputted by conferencer 175 via bus 107 which is supplied to an appropriate line circuit. Digital conferencing bridge 175 may be of the type disclosed in the U.S. Pat. No. 4,119,807, entitled "Digital Time Division Multiplex Switching System" and issued on Oct. 10, 1978, in which a message sample from each conferee of a conference connection is summed during a first time slot frame and in which the conference sum is distributed to each conferee during a next frame with respect to the conferee's assigned time slot. The conference summation is supplied to multiplexer 160 via bus 152 which passes the digital summation to the appropriate line circuit, such as line circuit 100-1 via bus 107.

Illustrated in FIG. 2 is an overview of the signal conditioning algorithm implemented in digital signal processor 104. Digital signal processor 104 is of the type disclosed in the *Bell System Technical Journal,* Vol. 60, No. 7, Part 2, dated September, 1981, starting at page 1449. The program begins operation as a result of either powering up or can be restarted from an external control lead (not shown). In the case of a call set up or conference call initiation, DSP 104 is reset to allow the algorithm to begin at a known state, such as block 2 of FIG. 2. Upon being reset, the program initializes the system variables as shown in block 2. Block 2 clears DSP 104 control registers so that the processor can initialize a program counter and certain parameters of the speech detector algorithm. In particular, two parameters, minimum EMP (MEMP) and a peak EMP (PEMP) (shown in FIG. 3) as defined above, are initialized to insure proper start up of the algorithm. MEMP is initialized to a maximum noise level (MNL) so that when a conferee's signal is applied to digital signal processor 104 it will quickly adapt to the correct noise level for that conferee. Also, to insure that an output to bus 106 initially has no gain adjustment, PEMP is initialized to correspond to an avarage speaker level. At this average level, a mapping of the PEMP parameter corresponds to no gain adjustment. Thus, a signal outputted to bus 106 from digital signal processor 104 is made equal to the signal inputted to digital signal processor 104 from EC 103 at start up time. Once these functions or parameter adjustments are completed, the algorithm is invoked.

The first procedure upon entering the algorithm is to calculate new transmit variables shown as block 3 of FIG. 2.

Figure 3:
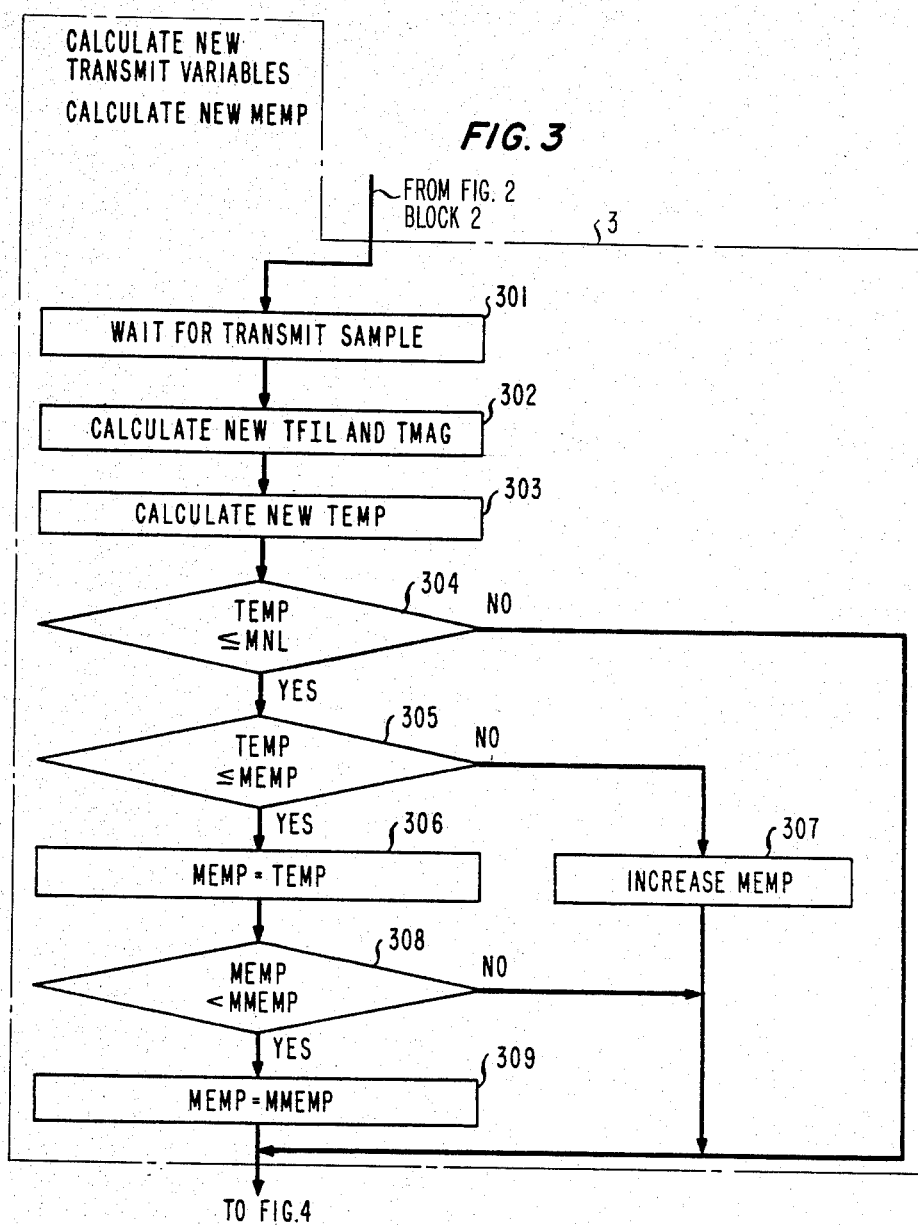
FIG. 3 is a detailed flow diagram for calculating transmit channel variables.

Referring to FIG. 3, there is shown a detailed flow diagram of the inline program shown as block 3 of FIG. 2 which calculates the DSP transmit variables such as MEMP. At block 301 DSP 104 waits for a transmit signal sample to be inputted from EC 103 via bus 108. Since transmit signal data is synchronous it is necessary for digital signal processor 104 to wait for the transmit data to be available before processing begins. Upon receiving a transmit signal sample the program proceeds to block 302 for calculating parameters TFIL and TMAG by converting the signal from a $\mu255$ coded value as it is outputted from EC 103 into a linear encoded value for internal processing. This linear representation allows for easier implementation of the DSP 104 digital filters and for tests and conversions of signals done by the algorithm. Once the linearized transmit signal sample is obtained it is processed by a software digital high pass filter to remove any DC components and low frequency AC components, such as 60 cycle hum, that might be present.

The DSP 104 digital high pass filter is a simple one stage recursive filter of the form:

TFIL = Current Input − Old Input + ($L \times$ Old TFIL)

The multiplier 'L' determines the cut off frequency (f3 db) of the filter by the relationship:

$L = 1 - (2 \times \pi \times f3$ db/(sampling frequency))

Since the sampling rate of codec 102 is one sample every 125 microseconds, the sampling frequency is 8 KHz. For example, operating at a 3 db cut off frequency of 200 Hz the constant L is equal to 0.85. Once this new value for the transmit filtered signal (TFIL) is calculated it is stored in DSP 104 in memory for later comparisons.

The transmit signal magnitude (TMAG) is equal to the absolute value of TFIL.

Still referring to FIG. 3, block 303 calculates a new transmit EMP (TEMP) as defined above. TEMP is calculated by passing TMAG through a DSP 104 software low pass filter, which emulates the following equation:

TEMP = $K \times$ TMAG + ((1 − $K$) $\times$ Old TEMP)

The constant K determines the cut off frequency (f3 db) of the low pass filter. In this interpretation, which uses an absolute value signal (TMAG), the constant K determines the number of past signal samples involved in the calculation of the short term signal energy. The constant K is equal to the reciprocal of the desired time constant times the sampling frequency. In our application, we are using a time constant of 16 milliseconds for the short term energy. Supplying a time constant of 16 milliseconds to the calculation gives a value for K equivalent to 0.0078125. Likewise, 1 − K is equivalent to 0.9921875. These two constants are then used to determine the new TEMP value which is stored in memory to be used in later signal comparisons.

Blocks numbered 304-309 determine a new value for the minimum EMP (MEMP). MEMP is used as an indication of the background noise level of the transmit signal appearing on line 108 (FIG. 1). This background noise level is used in the determination of whether a transmit signal (inputted signal) is speech or non-speech.

The actual calculation of MEMP is as follows. At box 304 a comparison is made between the current transmit EMP (TEMP) and a fixed maximum noise level (MNL) to provide an approximate indication of whether the transmit signal inputted via line 108 is speech or noise. MNL is to equivalent to a signal level of −43 dbm which corresponds to a noise level of 47 dBrnCo. If TEMP is greater than this maximum noise level, it is assumed that the inputted transmit signal is not background noise but a valid signal, and therefore the 'no' path out of block 304 is taken and MEMP is not updated.

If the transmit EMP (TEMP) is less than this maximum noise level, it is assumed that the input signal is most likely background noise and the 'yes' path is taken to block 305.

In block 305, if the calculated TEMP is less than the calculated MEMP the yes path is taken and the current MEMP is updated in memory to be equivalent to the calculated value of TEMP at box 306.

At block 308, a test is made to ensure that the minimum EMP does not fall below a fixed minimum value (MMEMP) equal to a constant of 33. If the current value of MEMP is less than this minimum threshold value (MMEMP), MEMP Is set to equal the minimum value at box 309.

Returning to box 305, if TEMP is greater than MEMP the program takes the no path to box 307 where MEMP is increased, which signifies that the transmit energy level (TEMP) is greater than what the program considers to be the current minimum energy level (MEMP). This may be due to switching of an echo suppressor located in the external network. At block 307 the program adjust MEMP upward to reach a level corresponding to the new background noise level. The upward adjustment is accounted for in box 307 as follows:

MEMP = Q × Old MEMP where Q equals 1.00011514 for an adjustment rate of 4 db/sec.

Since MEMP is allowed to adapt in the presence of weak speech signals there exists the possibility of MEMP adapting to the point of cutting off weak talkers. Two factors help minimize this problem however. First, intersyllable holdover reduces chopping at the end of weak syllables, and second, intersyllable pauses cause MEMP to drop instantly. In practice, it was observed that MEMP does not drift upward appreciably during weak speech with the current adaptation rate of 4 db/second.

Figure 4:
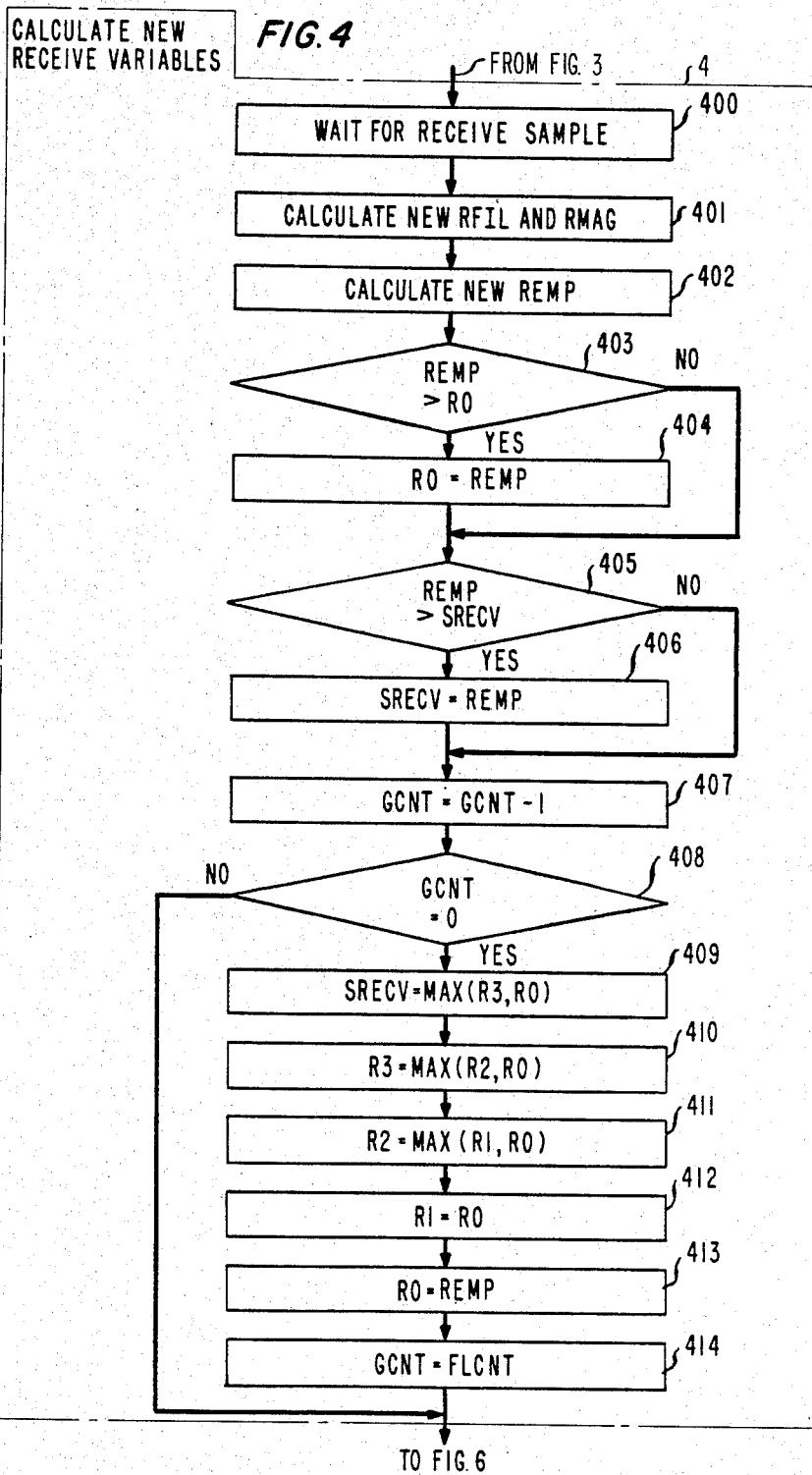
FIG. 4 is a detailed flow diagram for calculating receive channel variables.

Block 4 of FIG. 2 is detailed in FIG. 4 where the program calculates new receive variables (RFIL, RMAG and REMP) in a manner similar to those used to calculate transmit parameters (TFIL, TMAG and TEMP) for the transmit side.

At block 400, the program waits for a receive signal sample from multiplexer 150 via bus 107 (FIG. 1). At block 401 the receive signal sample is converted from a μ-255 encoding to a linear representation and processed by a software digital high pass filter having a f3 db of 200 Hz to obtain a new filtered receive signal value (RFIL). RMAG is set equal to the absolute value of RFIL.

Next a calculation of the receive signal short term energy (REMP) is made at block 402. The REMP calculation corresponds to that implemented for the transmit side (FIG. 3) with the same 16 millisecond time constant. Once the new values of RFIL, RMAG and REMP have been determined, it is necessary to determine a value for the expected echo energy.

Blocks 403-414 are used to calculate a delayed receive signal energy (SRECV) parameter. Since EC 103 can compensate for echo paths of up to 16 milliseconds, a software delay line consisting of 4 samples is used, in which each sample represents the maximum value of REMP over a 4 millisecond window.

At box 403 a comparison is made to decide if the current REMP is greater than the priorly stored maximum REMP value for the current 4 millisecond window (R0). If REMP is greater than R0, R0 is updated to equal REMP at block 404, otherwise, block 404 is bypassed leaving the value of R0 as the maximum REMP value for this 4 millisecond window.

At block 405 a comparison between REMP and the current output of the delay line (SRECV) is made. Since an echo could be considerably less than 16 milliseconds, if the current REMP is greater than the current SRECV, SRECV is updated to equal the current REMP at block 406. In this manner, the stretch receive output (SRECV) is the maximum worst case expected echo.

Figure 5:
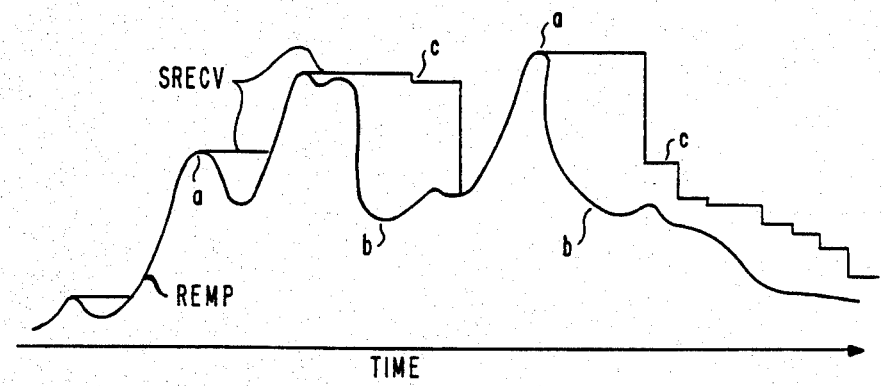
FIG. 5 is a diagram of a stretch receive signal.

Briefly referring to FIG. 5, there is shown a representation of a stretch receive signal (SRECV) in which the contoured line (b) represents a REMP signal during a passage of initial quiet through some speech activity and back to quiet again. The straight line segments (c) represent the expected echo or SRECV. It can be seen that peak values (a) are held over during the 16 millisecond window, that is, the longest echo path considered.

After 16 milliseconds, SRECV slowly drifts downward (c) following the decrease in REMP. Thus, any increase in REMP is reflected immediately in the output of the delay line (SRECV), whereas a decrease in REMP is delayed by the 16 milliseconds.

Returning to FIG. 4, the 16 millisecond delay line is implemented in boxes 407-414 in the following manner. At block 407 a count is maintained which represents how far the program is into a 4 millisecond window. After decrementing the counter (GCNT), a test is made to see whether the counter has reached zero at block 408. If the count has not reached zero, the program passes to the end of the routine. However, if the count has reached zero (representing the end of the current 4 millisecond window) the values in the delay line (R0, R1, R2, R3) are shifted. This is the first shown in box 409 by updating SRECV signal to be the maximum of either the previous signal in the delay line, R3, or the current input to the delay line which is R0.

Next, in box 410, the fourth value in the delay line, R3, is set equivalent to the maximum of the previous value R2 or the initial value R0. Similarly, at block 411 R2 is updated. Thus, if R0 exceeds R2, R3 or SRECV in the delay line during these calculations that value in the delay line is set to the value of R0. Therefore, an increasing REMP is propagated through the delay line when values in the delay line are updated.

At blocks 412 and 413, the value of R1 is set to R0, and R0 is set to the current REMP level to be used as the initial estimation of the maximum REMP for the next 4 millisecond window. Finally, at box 414, the software counter (GCNT) is reinitialized to a full 4 millisecond count. Upon exiting FIG. 4, the DSP program illustrated in FIG. 2 is prepared to start the actual calculation and determination as to whether a transmit signal is speech or non-speech commencing with block 6 of FIG. 2.

Figure 6:
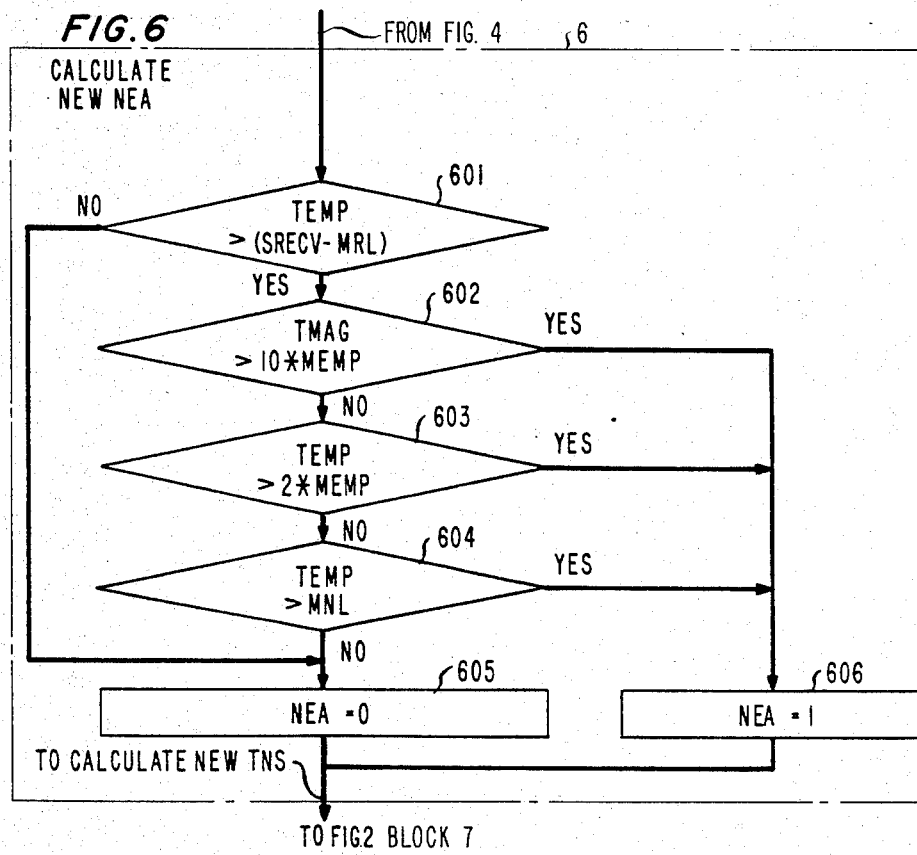
FIG. 6 is a flow diagram for determining near-end active.

Block 6 of FIG. 2 is detailed in FIG. 6 and shows the program steps for calculating a near-end active (NEA) flag by comparing the transmit and receive parameters calculated above. The comparisons (tests) determine whether a transmit signal is either speech originated by a conferee connected to bus 108, noise or echo. Thus, near-end active (NEA) equaling the value one represents a transmit signal as being true conferee speech, a value of NEA equal to zero represents the signal as being either noise or echo.

Referring to FIG. 6, block 601 is a comparison between the transmit energy level (TEMP) and the estimated echo energy level. The echo energy level consists of the stretch receive signal (SRECV) minus a minimum return loss (MRL). The minimum return loss (MRL) having a value of 24 db represents the program's estimation of the worst case return loss to be expected between the receive path returning to the conferee and the transmit path from the conferee. The presence of echo canceller 103 ensures an MRL value of 24 db. Without echo cancellor 103, a return loss as low as 0 db is possible. Thus, the calculation of NEA is greatly affected by the presence or absence of echo cancellor 103 when differentiating between conferee speech signals and echo signals.

If the transmit energy (TEMP) is not greater than the expected echo energy (SRECV-MRL), the program transfers to block 605 and sets near-end active (NEA) equal to 0 indicating that a transmit signal is not conferee speech.

On the other hand, if the transmit energy is greater than the expected echo energy, the program proceeds to block 602 where the program compares transmit parameters to determine whether the transmit signal has speech characteristics. The first comparison takes the magnitude of the transmit signal (TMAG) and determines whether it is greater than 10 times MEMP. Thus, if the instantaneous magnitude of the transmit signal is greater than 10 times our estimation of the background noise level, the program passes to block 606 and sets near-end active (NEA) equal to one indicating that a transmit signal represents true speech.

At block 603, the program compares transmit EMP (TEMP) and twice the minimum EMP (MEMP). In this way, the program determines whether the transmit energy level is twice the background noise level. This comparison is useful for detecting the application of tone signals since the instantaneous magnitude of tone signals may not be sufficient to trigger the previous detector in 602, but may be of sufficient energy to trigger the detector in 603.

If, as before, the detector at block 603 decides that the signal is speech, the yes path to block 606 is taken and the near-end active (NEA) is set to one. If the test at block 603 fails, the program falls through to block 604 and a final comparison between TEMP and a maximum noise level (MNL) is made. The maximum noise level (MNL) is selected to represent a noise level not expected to be achieved on any in-service trunk or station and is set at the 47 dBrnCo level. Any signal that exceeds a level of 47 dBrnCo is assumed to be speech and near-end active is set equal to one at block 605. Upon exiting either block 605 or block 606, the program has determined the current value for the near-end active (NEA) and falls through to block 7 of FIG. 2 in order to calculate a new trunk needs service (TNS) signal.

Figure 7:
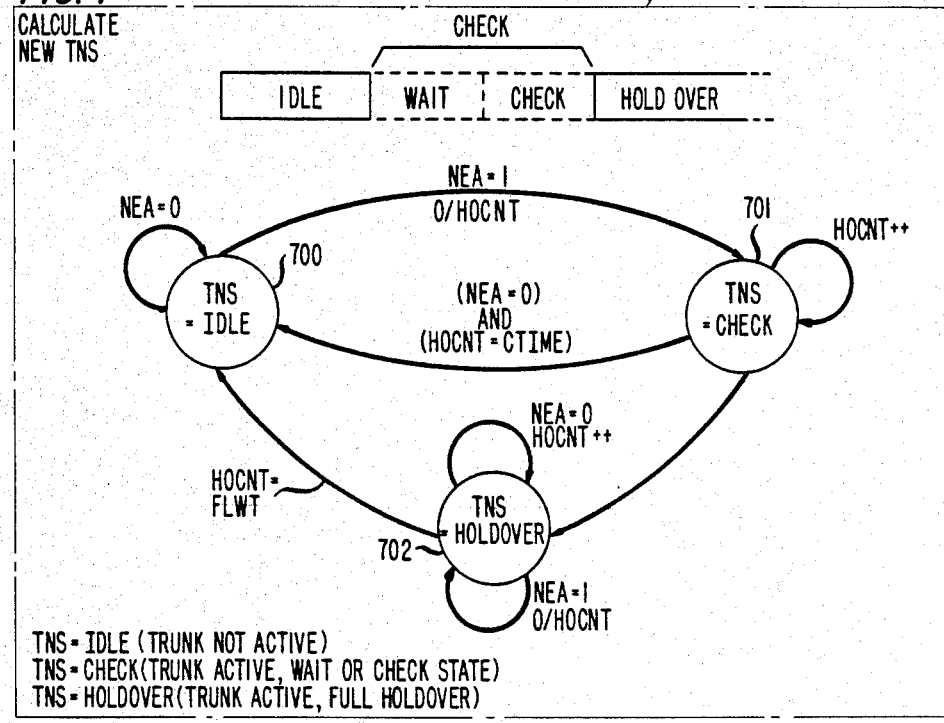
FIG. 7 is a state diagram illustrating the calculation of trunk needs service.

Referring to FIG. 7, there is shown a state diagram to better illustrate the operation of block 7 of FIG. 2 in the program. FIG. 7 represents a three state machine to derive a value for the trunk needs service (TNS) parameter. Basically, the program operates in one of three states depending on the time that the program has been in a current state and the current value of near-end active (NEA). TNS is a delayed version of the near-end active (NEA) parameter for bridging intersyllable gaps to avoid chopping (abruptly terminating) weak speech signals. The TNS signal is also used as a holdover at the end of words (speech signals) to eliminate clipping the tail ends of words, particularly if the end of a word is an unvoiced sound.

The state machine illustrated in FIG. 7 is implemented as follows.

In the idle state 700, a station connected to circuit 100-1 via line 108 (FIG. 1) is not active and transmit signals are considered to be either noise or echo. The program remains in state 700 for as long as the near-end active parameter is equal to zero. When near-end active is found to be a one (speech detected) the program initializes a holdover counter (HOCNT) to zero and transfers to check state 701. At state 701, the program has noted that a trunk connected to line 108 (FIG. 1) is active and starts the holdover count as a means of gauging how long it remains in state 701. During each iteration of the program (i.e., transmit sample received) the program increments the holdover count.

Referring to the diagram at the top of FIG. 7, while in the check state 701, the program first goes through a wait period of 16 milliseconds. During the wait period, no test of the near-end active signal is made. Once the wait period has been completed, the program enters a check period representative of state 701.

During the check period, if near-end active is found to be equal to 1, again representing further activity on line 108, the program enters the holdover state 702. The program remains in state 702 for as long as NEA equals 1 and for 300 milliseconds after the occurrence of the latest near-end active activity.

Briefly returning to state 701, if the program passes through the 16 millisecond check period without a second occurrence of near-end active the program returns to state 700. In this respect, if a noise spike on line 108 (FIG. 1) causes near-end active to be equal to one for a single sample period, the program will transfer from state 700 to state 701, but only for a maximum period of 32 milliseconds at which time it returns to idle state 700 and waits for further occurrences of near-end active.

Upon completing the TNS determination the program shown in FIG. 2 falls through to block 8 to calculate a new peak EMP (PEMP) value.

Figure 8:
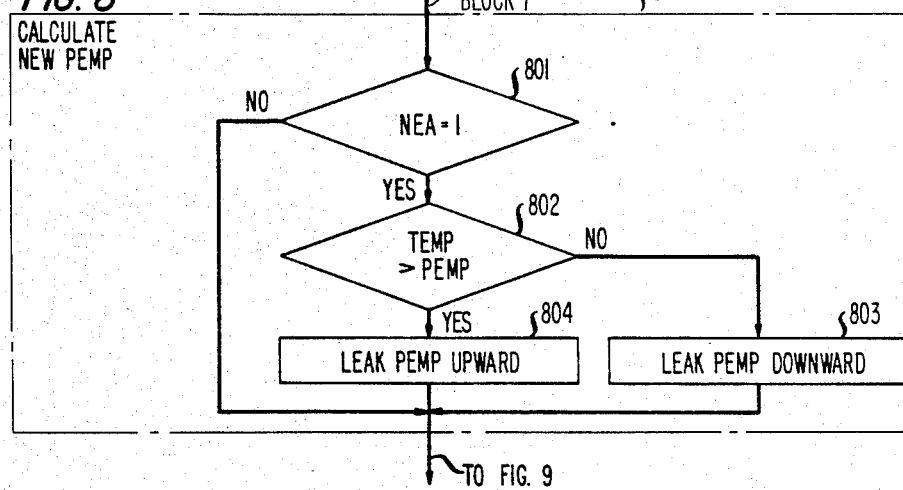
FIG. 8 is a detailed flow diagram showing the calculation of the peak energy of a signal.

FIG. 8 is a detailed flow diagram of block 8 of FIG. 2 in which the DSP 104 program calculates a new PEMP, which is used to estimate the speaker level. At block 801 a comparison is made to decide whether the current transmit signal is speech or non-speech by noting the value of near-end active (NEA). If NEA is not equal to a 1 the current transmit signal is not speech and the program transfers out of FIG. 8. If NEA is equal to 1, the signal is speech and, therefore, TEMP represents a speaker energy level.

The program proceeds to block 802 where a comparison between TEMP and PEMP is made. If TEMP is greater than the current PEMP, the program proceeds to block 804 to adjust the current PEMP upward, whereas if TEMP is less than the current PEMP, the program proceeds to block 803 to adjust the current PEMP downward.

In both cases, the new value for peak EMP (PEMP) is calculated by multiplying the prior value of PEMP by a constant Q having a value close to one. As mentioned above with respect to the calculation of MEMP, this procedure allows adjustments to PEMP to be defined in decibels per second.

The current values of Q are such that PEMP increases at a 2 db/second rate as well as decreases at a 2 db/second rate. As will be discussed shortly, the PEMP adjustment rate determines the rate at which automatic gain changes are made on the transmit speech signal. It is well known that the human ear does not perceive a discontinuity when gain changes are in the neighborhood of 2 to 4 db/second. This has been shown to be true in our experimentation with the invention disclosed herein.

Once a new PEMP value is established, the program proceeds to block 9 of FIG. 2 to calculate a HOLD value. Block 9 of FIG. 2 is detailed in FIG. 9 and proceeds as follows.

The HOLD flag represents a determination of whether the transmit signal is speech originating from the last conferee to speak. As shown in block 901, a test of TNS is made and if TNS does not equal IDLE, then HOLD is set to a 1 (block 903) as a means of noting that DSP 104 is processing speech signals. If the trunk connecting to line 108 (FIG. 1) is not active, (TNS=IDLE), then the program proceeds to block 902 and performs a second test. At block 902, the program compares the receive signal EMP (REMP) with a minimum speech level constant (MSL). Thus, by comparing REMP with some fixed level (MSL), the program emulates a crude fixed threshold speech detector that determines whether a second conferee in the conference is speaking.

Figure 9:
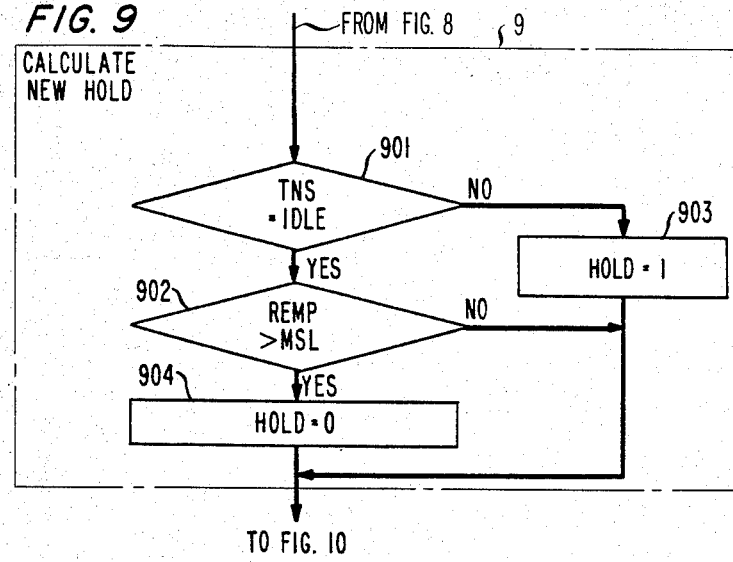
FIG. 9 is a detailed flow diagram showing the calculation of the HOLD flag.

Still referring to FIG. 9, if REMP is greater than MSL the program proceeds to block 904 where HOLD is set to zero as an indication that the line circuit, such as circuit 100-1 of FIG. 1, is not active nor is it the last talker. Thus, at the end of the routine shown in FIG. 9 if the HOLD flag is equal to a one, the DSP program has determined that either transmit voice signals are being received or that transmit voice had been received and no other conferee has started speaking (last talker holdover mode). If HOLD equals zero the program has determined that transmit voice signals are not being received and that another conferee is speaking.

Figure 10:
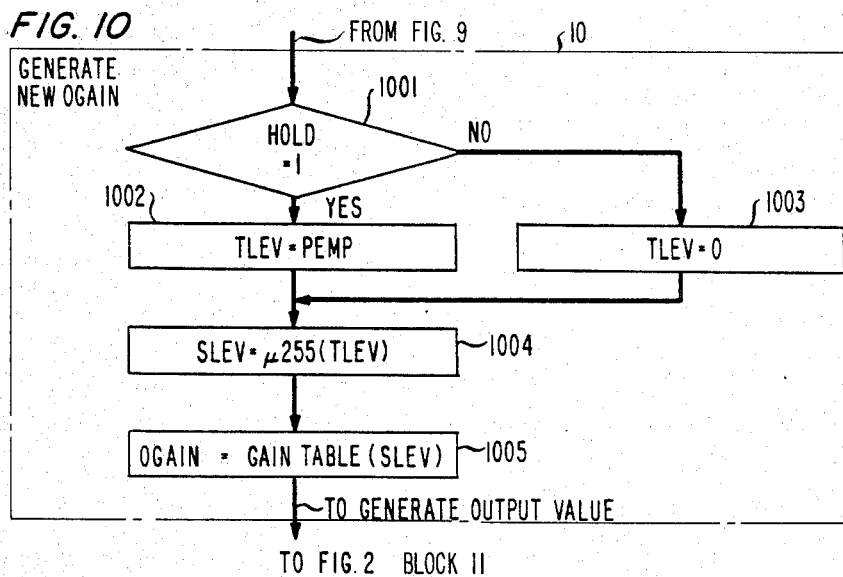
FIG. 10 is a detailed flow diagram showing the calculation of the gain to be applied to a signal.

FIG. 10 is a detailed flow diagram of block 10 of FIG. 2 in which at block 1001 a test on the current HOLD flag is made. If the value of HOLD is zero (which indicates that the circuit should not be active) the program proceeds to block 1003 where the talker level (TLEV) is set equal to zero. If the value of HOLD equals one (which signifies that DSP 140 is processing speech signals or that a last talker holdover mode has been established) the talker level is set equal to the current peak EMP (PEMP). The new talker level (TLEV) represents the speech level of the conferee connecting to line 108. A speech signal level of zero has significance since it represents the absence of speech signals on line 108 and activity on another line in the conference.

At block 1004, the program calculates an estimation of the speaker level by converting the linear encoded talker level (TLEV) into a $\mu 255$ code. The $\mu 255$ encoding technique is linear for very small signals but is approximately logrithmic for larger signals. Thus, the estimation of the speaker level (SLEV) is approximately the log of the talker level and represents an estimation of the speech level of a talker similar to that represented by a volume unit or VU meter.

Once a speaker level (SLEV) is determined, it is used as an index into a special gain table (not shown) to obtain an output gain value (OGAIN). Because the speaker level (SLEV) is implemented as a $\mu 255$ value, the gain table is much smaller than if the talker level (TLEV) were simply used in its linear form. In addition, the gain table is approximately logrithmic, that is, the difference from one table entry to the next corresponds to about 0.5 db change in the level of the speaker on that line. Thus, entries in the table are selected in a fashion to modify the transmit signal with the appropriate gain. The gain table as implemented is a segmentized representation of the input/output gain map shown in FIG. 11. For example, if the input speaker level is at a value of $-15$ dbm, the output signal level will be modified by a gain of zero thus transmitting out a signal of $-15$ dbm, whereas if the input signal is much weaker, say $-30$ dbm the output signal will be modified by a gain of $+10$ db and actually be outputted at $-20$ dbm. In a similar manner, if the input signal is 0 dbm the output signal will be $-10$ dbm. Therefore, a $-15$ dbm signal will not be modified since that signal level represents the average speaker level in a conference connection. A speech level lower than $-15$ dbm will have gain added to the signal, up to a maximum of 10 db gain across a 15 db range. Thus, as a speaker becomes softer up to a maximum gain of 10 db is applied. Similarly, as the speaker level increases, a negative gain (actually a loss) is inserted so as to bring the loud speaker closer to the average speaker level.

The value of 10 db of gain is assumed to be the maximum amount of gain that the speech treatment arrangement could apply in a conferencing environment and still maintain stability.

Returning to FIG. 10, block 1005 calculates an output gain value (OGAIN) using the gain table stored in DSP 104 memory. The $\mu 255$ encoding takes a linear TLEV value and converts it into a signed 8 bit SLEV quantity. Of the 8 bits the first bit is a sign bit and the 7 remaining bits are used to address the 128 entries of the gain table. As mentioned previously, each entry in the gain table corresponds to a given speech level with the difference between entries being approximately 0.5 db. Once the output gain is determined, it is used to modify the transmitted signal and generate the output of DSP 104 to bus 106.

Note that a talker level (TLEV) equal to zero causes a unique value to be selected from the gain table. That is the $\mu 255$ encoding of zero provides a unique speech level (SLEV) value. This unique value is used to enter the gain table and obtain a unique gain value corresponding to a loss of 20 db. Thus, whenever a talker level (TLEV) of zero is used, a loss of 20 db is inserted in the transmit path. The loss of 20 db is selected when speech is not detected on line 108 and speech is detected on bus 107 as determined by the HOLD flag. Thus, only the conferees speaking or the conferee who last spoke will have a talker level (TLEV) representing their current peak EMP (PEMP). The talker level (TLEV) of non-speaking conferees in the conference will be set to a level of zero by block 1003 and have a loss of 20 db put on their respective output signal (106).

Returning to FIG. 2, block 12 calculates a new adapt parameter which is an on or off signal supplied to echo cancellor 103. The adapt signal prevents echo cancellor 103 from adapting to pure tone signals. This is necessary since an echo cancellor may allow instability to occur if it adapts to pure tones present on line 109. Thus, DSP 104 monitors the receive path and differentiates between pure tone and wideband signals and sets lead 105 to a logic one state during the presence of wideband signals thereby allowing echo cancellor 103 to adapt to these signals only. The adaption processes represented by block 12 of FIG. 2 provides a holdover time of 30 milliseconds to provide the echo cancellor with a stable signal.

Once the program completes processing in block 12 (FIG. 1), it transfers to block 3 and waits for a new transmit signal to be inputted to DSP 104 and proceeds as disclosed above.

Conclusion

It is obvious to one skilled in the art that the invention disclosed herein is not limited to the embodiment disclosed in the accompanying drawing and foregoing detailed description, but can be arranged through the substitution, addition and/or deletion of components and function without departing from the scope and spirit of the invention.

For example, echo cancellor 103 may be comprised of two cascaded echo cancellors to increase the echo return path from 16 milliseconds to 32 milliseconds. Also, the gain table disclosed herein may be revised so that the increment between adjacent entries is greater than or less than the 0.5 db increment disclosed herein.

Further, the gain table may be constructed to be compatible with other encoding formats in place of the μ255 format disclosed herein or the specific gain values used may be different. Still further, the values of constant parameters such as MNL, MMEMP, MRL or MSL as well as the time constants and adjustment rates disclosed herein may be changed to suit other applications of the invention.

What is claimed is:

1. A speech conditioning arrangement adapted for use in a transmission line having a transmit channel for receiving signals from a first conferee and a receive channel for receiving signals from at least one other conferee comprising means for identifying signals contained on said transmit channel as being either transmit speech signals or transmit nonspeech signals, and means for adjusting the level of said transmit speech signals and said transmit nonspeech signals and for supplying the resulting signals to said transmit channel, the level of said transmit nonspeech signals being adjusted to the level of transmit speech signals priorly supplied to said transmit channel when said first conferee was the last of said conferees to speak.

2. The invention set forth in claim 1 wherein said speech conditioning arrangement further comprises means for cancelling echo signals present on said transmit channel.

3. The invention set forth in claim 1 wherein said identifying means includes a transmit channel speech detector.

4. The invention set forth in claim 3 wherein said transmit channel speech detector includes means for deriving a representation of the average energy value of the signals contaned on said transmit channel, said identification of said transmit speech signals and said transmit nonspeech signals being made in response to said representation.

5. The invention set forth in claim 4 wherein said transmit channel speech detector further includes means for deriving a peak energy value from said average energy value, said peak energy value being adapted to the value of said average energy value at a predetermined rate, said adjusting means adjusting the level of said transmit speech signals as a function of said peak energy value.

6. The invention set forth in claim 1 wherein said adjusting means includes means for adjusting said transmit nonspeech signals to a predetermined level when said at least one other conferee is speaking or was the last to speak.

7. A signal conditioning circuit adapted for use in a transmission line having a transmit channel for receiving signals from a conferee and a receive channel for receiving signals from at least one other conferee comprising means for identifying signals contained on said transmit channel as being either transmit speech signals or transmit nonspeech signals, and means for adjusting the level of said transmit speech signals and said transmit nonspeech signals and for supplying the resulting signals to said transmit channel, the level of said transmit nonspeech signals being adjusted to a predetermined level when said other conferee is speaking or was the last to speak and being adjusted to the level of transmit speech signals priorly supplied to said transmit channel when said transmit channel conferee was the last to speak.

8. The invention set forth in claim 7 wherein said signal conditioning circuit further includes means for cancelling echo signals appearing on said transmit channel.

9. The invention set forth in claim 7 wherein said identifying means includes a speech detector.

10. The invention set forth in claim 9 wherein said identifying means further includes means for deriving a representation of the average energy value of the signals contained on said transmit channel, said identification of said transmit speech signals and nonspeech signals being made in response to said representation.

11. The invention set forth in claim 10 wherein said identifying means further includes means for deriving a peak energy value from said average energy value, said peak energy value being adapted to the value of said average energy value at a predetermined rate, said adjusting means adjusting the level of said transmit speech signals as a function of said peak energy value.

12. In a conferencing system in which speech signals from a group of conferees are summed by a conferencing circuit during a first frame and in which the summation is distributed to each conferee, less the conferee's sample contribution, during a next frame, a signal conditioning arrangement adapted for use in said conferencing system for treating a respective conferee's speech signals and nonspeech signals prior to said summation, comprising a transmit channel and a receive channel, means for identifying signals contained on said transmit channel as being either conferee speech signals or nonspeech signals, means for identifying summation signals contained on said receive channel as being either speech signals or nonspeech signals, and means for adjusting the level of said conferee speech signals and conferee nonspeech signals and for supplying the resulting signals to said conferencing circuit, the level of said conferee nonspeech signals being adjusted to the level of conferee speech signals priorly supplied to said conference circuit when said summation signals are identified as being nonspeech signals and said conferee nonspeech signals follow said conferee speech signals.

13. The invention set forth in claim 12 wherein said signal conditioning arrangement further comprises means for cancelling echo signals when they are on said transmit channel.

14. The invention set forth in claim 12 wherein said transmit identifying means includes a speech detector and said receive identifying means includes a speech detector.

15. A method of treating speech signals, said method adapted for use in a conferencing system having a transmit channel for receiving signals from a conferee and a receive channel, comprising the steps of identifying signals contained on said transmit channel as being either transmit speech signals or transmit nonspeech signals, and adjusting the level of said transmit speech signals and nonspeech signals and supplying the resulting signals to said conferencing system, said adjusting step including the step of adjusting the level of said transmit nonspeech signals to the level of transmit speech signals priorly supplied to said conferencing system when said transmit channel conferee was the last to speak.

* * * * *